US012656043B2

(12) United States Patent
Bell

(10) Patent No.: US 12,656,043 B2
(45) Date of Patent: Jun. 16, 2026

(54) SOLAR POWERED REFRIGERATOR DEVICE

(71) Applicant: Kelvin Bell, Killeen, TX (US)

(72) Inventor: Kelvin Bell, Killeen, TX (US)

( * ) Notice: Subject to any disclaimer, the term of this patent is extended or adjusted under 35 U.S.C. 154(b) by 97 days.

(21) Appl. No.: 18/734,061

(22) Filed: Jun. 5, 2024

(65) Prior Publication Data

US 2025/0377149 A1 Dec. 11, 2025

(51) Int. Cl.

| *F25D 11/02* | (2006.01) |
|---|---|
| *F25C 1/24* | (2018.01) |
| *F25C 5/20* | (2018.01) |
| *F25D 29/00* | (2006.01) |
| *H02J 7/35* | (2006.01) |
| *H02S 20/30* | (2014.01) |
| *H02S 40/38* | (2014.01) |

(52) U.S. Cl.

CPC .............. *F25D 11/02* (2013.01); *F25C 1/24* (2013.01); *F25C 5/22* (2018.01); *F25D 29/003* (2013.01); *H02S 20/30* (2014.12); *H02S 40/38* (2014.12); *F25C 2400/10* (2013.01); *H02J 7/35* (2013.01)

(58) Field of Classification Search

CPC ............. H02S 40/38; F25D 11/02; F25C 1/24
See application file for complete search history.

(56) References Cited

U.S. PATENT DOCUMENTS

| 5,501,083 | A | * | 3/1996 | Kim ....................... F25B 27/005 |
|---|---|---|---|---|
| | | | | 307/64 |
| 6,240,737 | B1 | * | 6/2001 | Albiez .................. F25B 27/002 |
| | | | | 62/235.1 |

| 6,253,563 | B1 | * | 7/2001 | Ewert ................... F25D 11/006 |
|---|---|---|---|---|
| | | | | 62/235.1 |
| 7,476,832 | B2 | * | 1/2009 | Vendig .................... H02S 20/23 |
| | | | | 250/203.1 |
| 8,181,474 | B2 | | 5/2012 | Chen |
| 10,247,463 | B1 | | 4/2019 | Garcia |
| D984,219 | S | | 4/2023 | Sherwin |
| 2001/0039805 | A1 | * | 11/2001 | Tavolazzi .............. F25D 29/005 |
| | | | | 236/51 |
| 2016/0123633 | A1 | | 5/2016 | Ocansey |
| 2018/0106530 | A1 | * | 4/2018 | DeVos .................. F25B 27/005 |
| 2020/0187615 | A1 | | 6/2020 | Hockaday, Jr. |
| 2021/0318050 | A1 | * | 10/2021 | Mitchell ................... F25C 1/04 |
| 2022/0026132 | A1 | | 1/2022 | Gransden |
| 2023/0112280 | A1 | | 4/2023 | Banal |
| 2023/0314067 | A1 | * | 10/2023 | You ....................... F25D 23/062 |
| | | | | 62/340 |

FOREIGN PATENT DOCUMENTS

| TW | M351334 U | * | 2/2009 |
|---|---|---|---|
| WO | WO9856948 | | 10/1998 |

* cited by examiner

*Primary Examiner* — Lionel Nouketcha

(57) ABSTRACT

A solar powered refrigerator device for cooling food items and producing ice cubes in a remote location includes a refrigerator which has an internal compartment for containing cold food items. A refrigeration unit is integrated into the refrigerator to cool the cold food items in the internal compartment. A door is hingedly disposed on the refrigerator for opening and closing the internal compartment and an ice maker is integrated into the refrigerator to release ice cubes for cooling a beverage. The refrigerator has a peaked housing located on top of the refrigerator and the peaked housing tapers into a peak such that the peaked housing has a triangular shape.

8 Claims, 6 Drawing Sheets

SOLAR POWERED REFRIGERATOR DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to refrigerator devices and more particularly pertains to a new refrigerator device for cooling food items and producing ice cubes in a remote location. The device includes a refrigerator that has an internal compartment for storing cold food items and an ice maker integrated into the refrigerator for producing ice cubes and a peaked housing mounted on top of the refrigerator. The device includes a pair of solar panels each mounted on the peaked housing for supplying electrical power to the refrigerator and the ice maker.

(2) Description of Related Art Including Information Disclosed Under 37 CFR 1.97 and 1.98

The prior art relates to refrigerator devices including a variety of cooling devices that each at least includes a refrigeration unit for generating cooled air and a solar panel for powering the refrigeration unit and a variety of refrigerated cooler devices that each at least includes a thermally insulated cooler and refrigeration unit integrated into the thermally insulated cooler for cooling an interior of the thermally insulated cooler and a solar panel mounted to the thermally insulated cooler for powering the refrigeration unit. In no instance does the prior art disclose a solar powered refrigerator device that includes a refrigerator for storing cold food items and an ice maker integrated into the refrigerator for producing ice cubes and a pair of solar panels which are each disposed on a peaked housing of the refrigerator for powering the refrigerator.

BRIEF SUMMARY OF THE INVENTION

An embodiment of the disclosure meets the needs presented above by generally comprising a refrigerator which has an internal compartment for containing cold food items. A refrigeration unit is integrated into the refrigerator to cool the cold food items in the internal compartment. A door is hingedly disposed on the refrigerator for opening and closing the internal compartment and an ice maker is integrated into the refrigerator to release ice cubes for cooling a beverage. The refrigerator has a peaked housing located on top of the refrigerator and the peaked housing tapers into a peak such that the peaked housing has a triangular shape.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
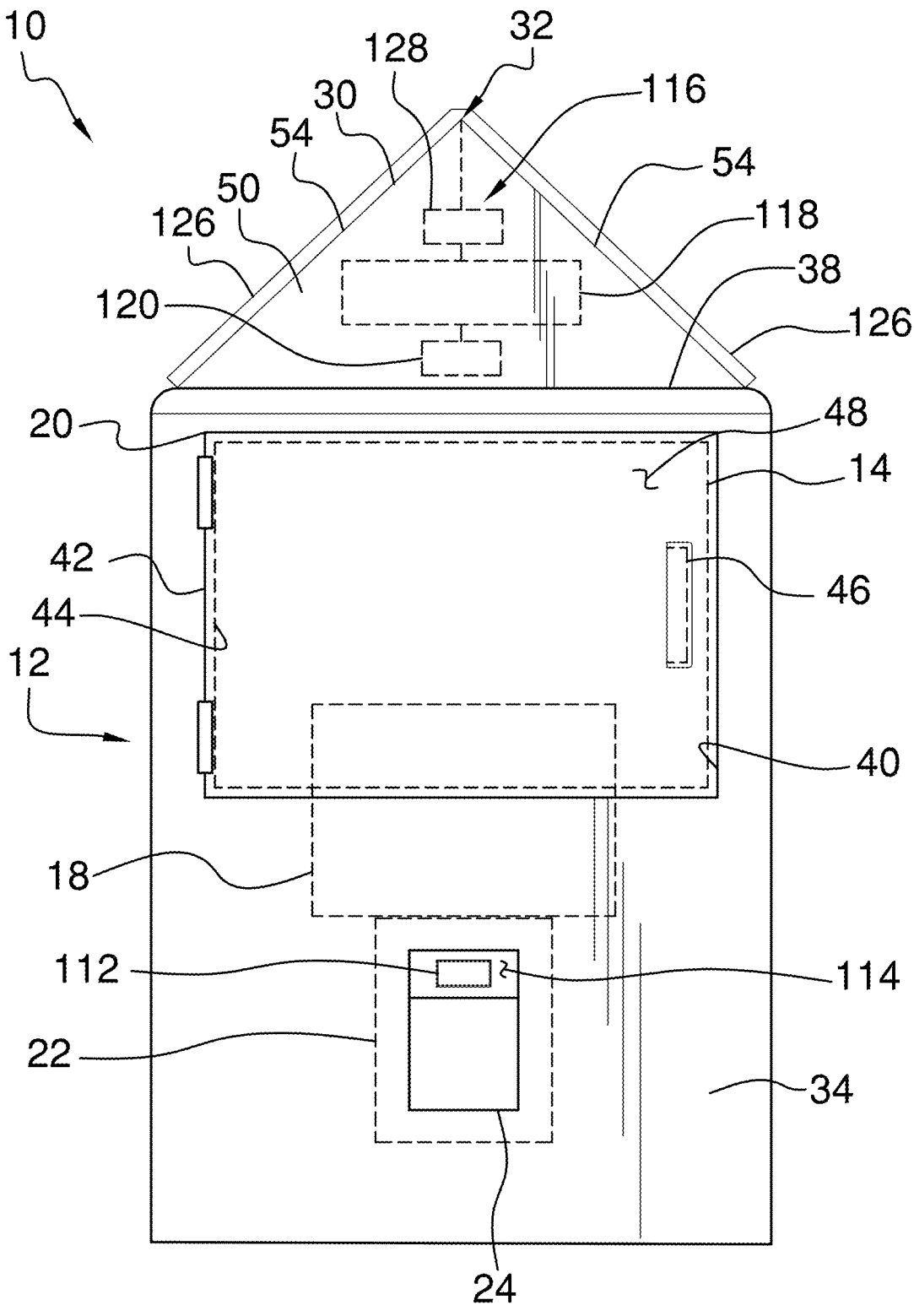
FIG. 1 is a front phantom view of a solar powered refrigerator device according to an embodiment of the disclosure.
Figure 2:
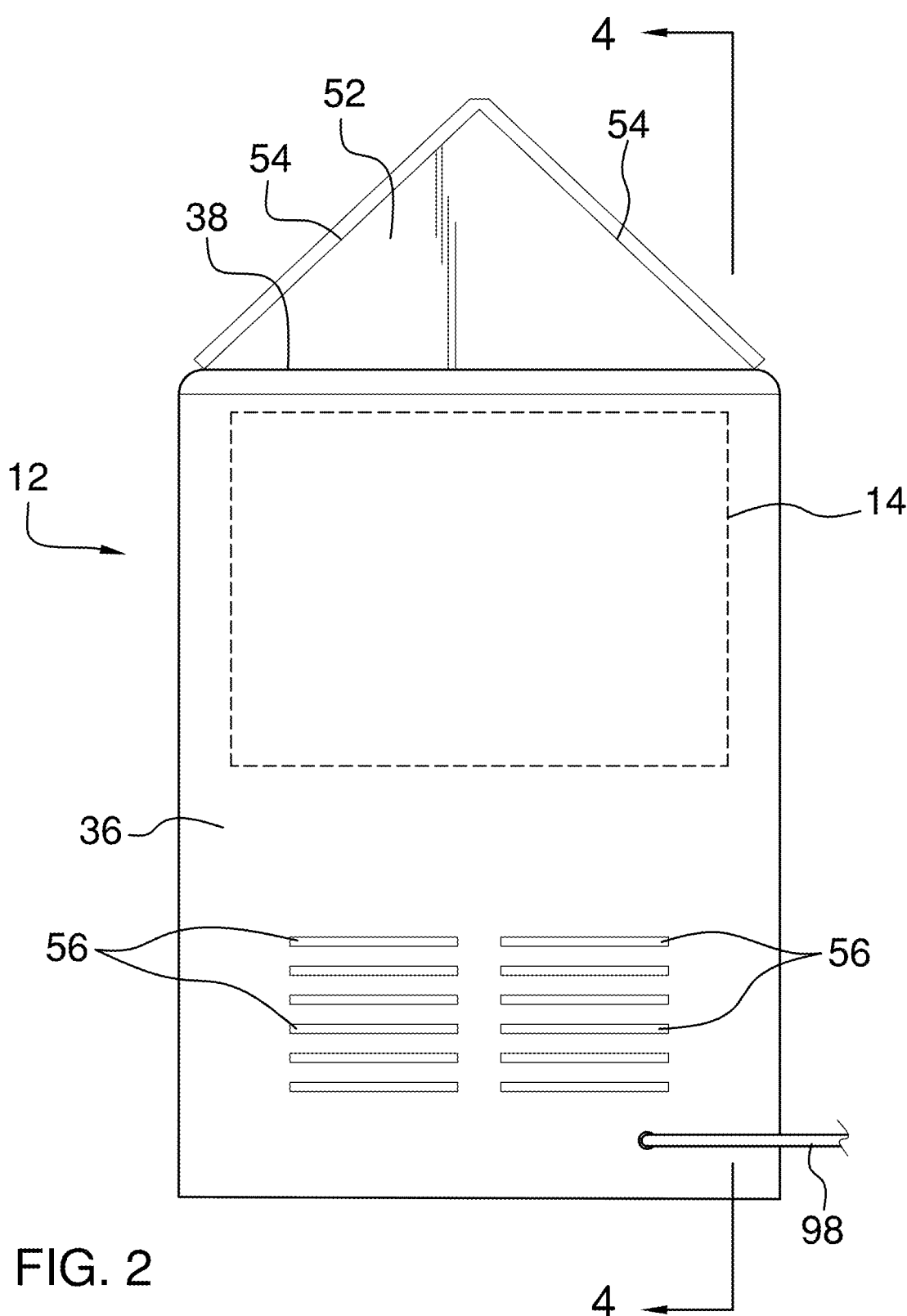
FIG. 2 is a back phantom view of an embodiment of the disclosure.
Figure 3:
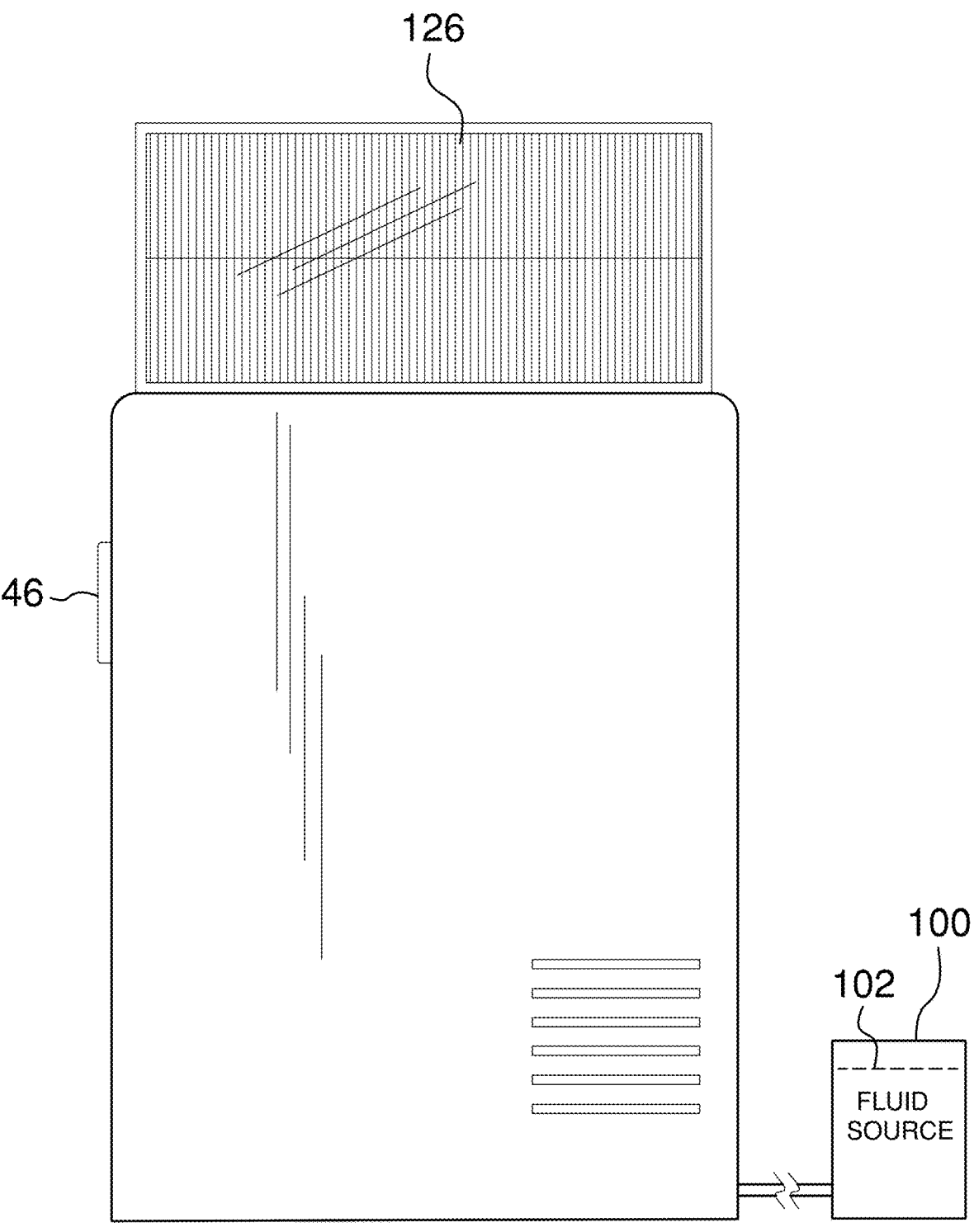
FIG. 3 is a left side view of an embodiment of the disclosure.
Figure 4:
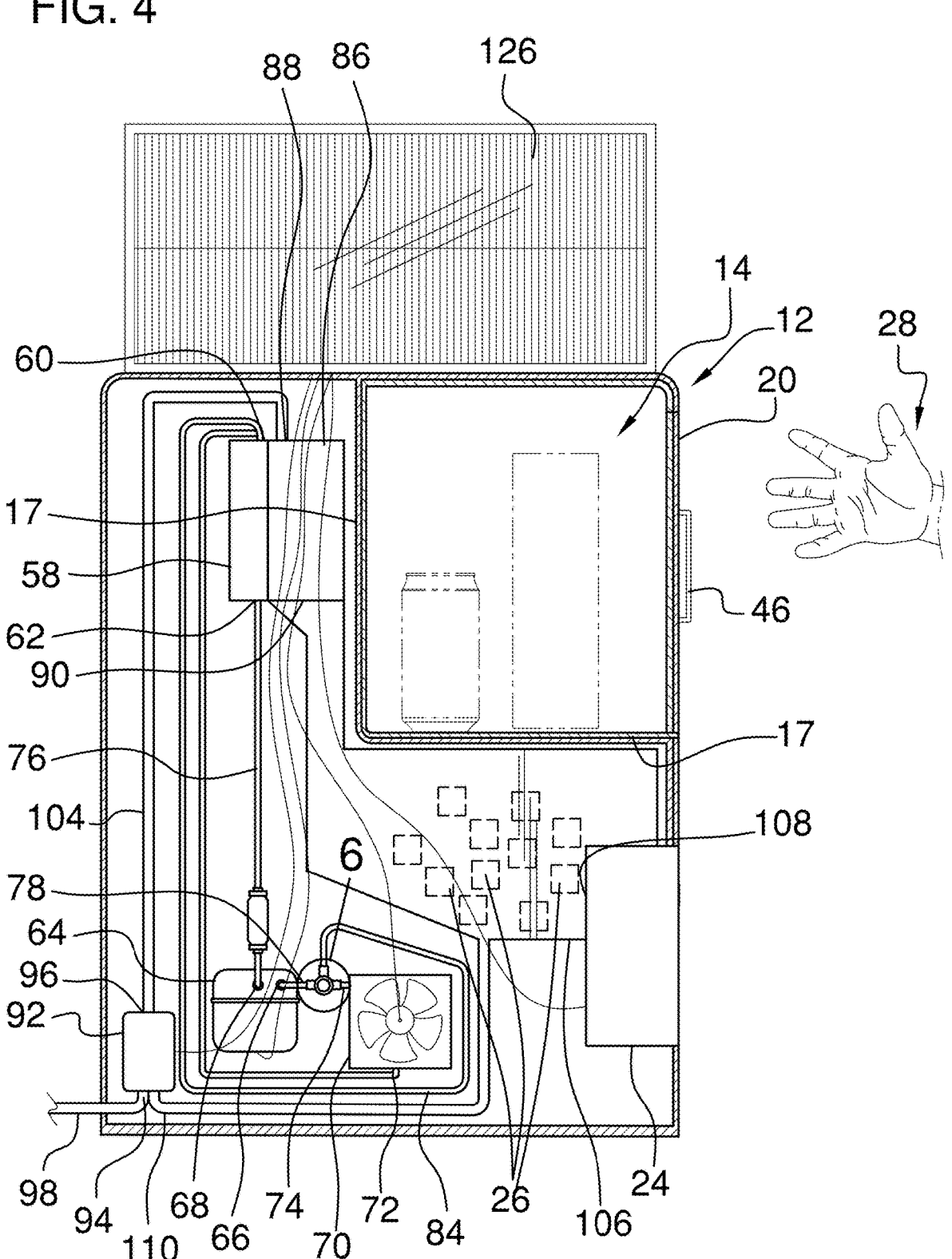
FIG. 4 is a cross sectional view taken along line 4-4 of FIG. 2 of an embodiment of the disclosure.
Figure 5:
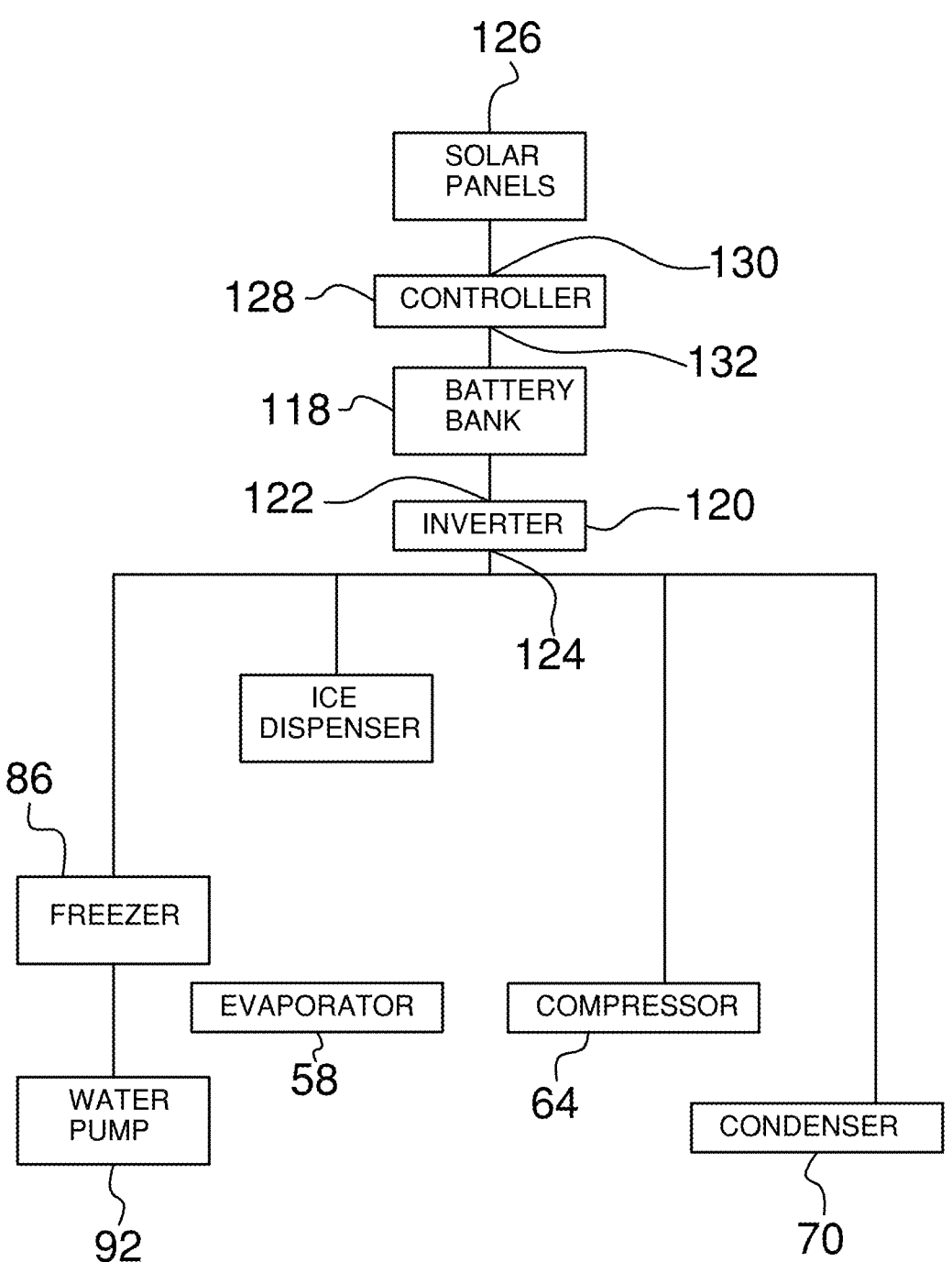
FIG. 5 is a schematic view of an embodiment of the disclosure.
Figure 6:
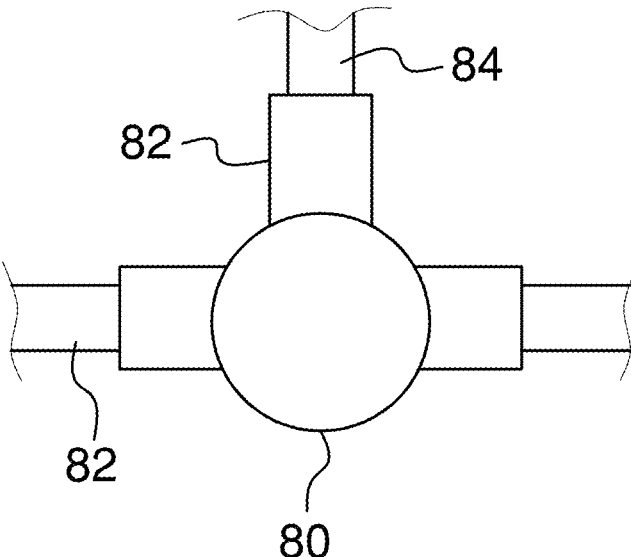
FIG. 6 is a magnified detail view taken from circle 6 of FIG. 4 of an embodiment of the disclosure.

With reference now to the drawings, and in particular to FIGS. 1 through 6 thereof, a new refrigerator device embodying the principles and concepts of an embodiment of the disclosure and generally designated by the reference numeral 10 will be described.

As best illustrated in FIGS. 1 through 6, the solar powered refrigerator device 10 generally comprises a refrigerator 12 that has an internal compartment 14 which can contain cold food items 16. The cold food items 16 may be chilled beverage containers or perishable food or any other type of food item that needs to be kept in a cooled environment to remain fresh. Additionally, the internal compartment 14 is defined by thermally insulated walls 17 to inhibit thermal communication between the internal compartment 14 and ambient air. The refrigerator 12 has a refrigeration unit 18 which is integrated into the refrigerator 12 and the refrigeration unit 18 is in thermal communication with the internal compartment 14. In this way the refrigeration unit 18 is enabled to cool the internal compartment 14 thereby cooling the cold food items 16 in the internal compartment 14. The refrigerator 12 has a door 20 which is hingedly disposed on the refrigerator 12 for opening and closing the internal compartment 14. Additionally, the refrigerator 12 includes an ice maker 22 and the ice maker 22 includes a dispenser 24 which is integrated into the refrigerator 12 thereby enabling the ice maker 22 to be actuated to release ice cubes 26 through the dispenser 24. In this way the ice maker 22 enables a user 28 to access the ice cubes 26 for cooling a beverage. Additionally, the refrigerator 12 has a peaked housing 30 which is located on top of the refrigerator 12 and the peaked housing 30 tapers into a peak 32 such that the peaked housing 30 has a triangular shape.

The refrigerator 12 has a front wall 34 and a back wall 36 and a top wall 38; the internal compartment 14 is located adjacent to the top wall 38 and the internal compartment 14 extends from the front wall 34 toward the back wall 36. The front wall 34 has an opening 40 extending into the internal compartment 14 and the door 20 has a lateral edge 42 which is hingedly coupled to a lateral bounding edge 44 of the opening 40 in the front wall 34. The door 20 closes the opening 40 when the door 20 is in a closed position and the door 20 exposes the opening 40 when the door 20 is in an open position. A handle 46 is attached to an outwardly facing surface 48 of the door 20 which can be gripped for opening and closing the door 20.

The peaked housing 30 is disposed on the top wall 38 of the refrigerator 12 and the peaked housing 30 has a forward wall 50 and a rear wall 52 and a pair of sidelong walls 54. The forward wall 50 is aligned with the front wall 34 of the refrigerator 12 and the rear wall 52 is aligned with the back wall 36 of the refrigerator 12. Each of the pair of sidelong walls 54 slants toward each other such that the pair of sidelong walls 54 intersect at the peak 32. Furthermore, the peak 32 is spaced from the top wall 38 of the refrigerator 12 and the peak 32 is oriented to extend between the forward wall 50 and the rear wall 52. The refrigerator 12 has a plurality of vents 56 each extending through the back wall 36 of the refrigerator 12 to pass air into the refrigerator 12.

The refrigeration unit 18 includes an evaporator 58 that is positioned within the refrigerator 12. The evaporator 58 has an input 60 and an output 62 and the evaporator 58 is in thermal communication with the internal compartment 14 in the refrigerator 12 thereby enabling the evaporator 58 to cool the internal compartment 14. The refrigeration unit 18 includes a compressor 64 which is positioned within the refrigerator 12 and the compressor 64 has an exhaust 66 and an intake 68. The refrigeration unit 18 includes a condenser 70 that is positioned within the refrigerator 12 and the condenser 70 has an exhaust 72 and an intake 74. Additionally, the condenser 70 is in fluid communication with the plurality of vents 56 in the back wall 36 of the refrigerator 12 to direct heated air which is produced by heat exchange with the refrigerant in the evaporator 58 outwardly through the plurality of vents 56. Each of the evaporator 58 and the compressor 64 and the condenser 70 may comprise refrigeration components commonly employed in residential refrigerators.

The refrigeration unit 18 includes a first refrigerant tube 76 which is fluidly coupled between the output 62 on the evaporator 58 and the intake 68 of the compressor 70 thereby enabling a refrigerant to be transported from the evaporator 58 and the compressor 70. The refrigeration unit 18 includes a second refrigerant tube 78 that is fluidly coupled between the exhaust 66 of the compressor 64 and the intake 74 of the condenser 70 thereby enabling the refrigerant to be transported from the compressor 64 to the condenser 70. Furthermore, the second refrigerant tube 78 has a bypass valve 80 which is fluidly integrated into the second refrigerant tube 78 and the bypass valve 80 has an outlet 82. The bypass valve 80 may comprise a thermally actuated gaseous valve that is commonly employed on refrigeration units for recirculating the refrigerant when the refrigerant is below a threshold temperature. The refrigeration unit 18 includes a third refrigerant tube 84 which is fluidly coupled between the outlet 82 of the bypass valve 80 and the input 60 of the evaporator 58. In this way the refrigerant is enabled to be transported from the bypass valve 80 to the evaporator 58 when the refrigerant is below the threshold temperature.

The ice maker 22 includes a freezer 86 which is positioned within the refrigerator 12 and the freezer 86 has a fluid inlet 88 and an ice outlet 90. The freezer 86 may comprise an electric freezer of any conventional design that is capable of freezing water into ice cubes. The ice maker 22 includes a water pump 92 which is positioned within the refrigerator 12 and the water pump 92 has an input 94 and an output 96. Additionally, the water pump 92 may comprise an electric water pump or the like. The ice maker 22 includes a first fluid supply hose 98 which is fluidly coupled to the input 94 of the water pump 92. The first fluid supply hose 98 extends outwardly through the back wall 36 of the refrigerator 12 thereby enabling the first fluid supply hose 98 to be fluidly coupled to a fluid source 100 thereby enabling the water pump 92 to receive a fluid 102 from the fluid source 100. The fluid source 100 may be a water hose, such as a garden hose for example, and the fluid 102 may be water.

The ice maker 22 includes a second fluid supply hose 104 which is fluidly coupled between the output 96 of the water pump 92 and the fluid inlet 88 of the freezer 86. In this way the water pump 92 is enabled to pump the fluid 102 into the freezer 86 thereby enabling the freezer 86 to freeze the fluid 102 into the ice cubes 26. The ice maker 22 includes a chute 106 which is attached to the ice outlet 90 of the freezer 86 thereby enabling the chute 106 to receive the ice cubes 26 produced by the freezer 86. Furthermore, the chute 106 is coupled to an inlet 108 of the dispenser 24 thereby enabling the dispenser 24 to receive the ice cubes 26. Additionally, the dispenser 24 extends through the front wall 34 of the refrigerator 12. The refrigeration unit 18 includes a drain tube 110 which is fluidly coupled between the chute 106 and the water pump 92 thereby enabling water produced by melting of the ice cubes 26 to be released through the water pump 92.

The dispenser 24 includes a dispense button 112 that is movably disposed on an exposed surface 114 of the dispenser 24 with respect to the front wall 34 of the refrigerator 12. In this way the dispense button 112 can be manipulated by the user 28. The dispenser 24 is actuated to dispense the ice cubes 26 while the dispense button 112 is being depressed. Conversely, the dispenser 24 is de-actuated when the dispense button 112 is not being depressed. The dispenser 24 may comprise an electromechanical ice cube dispenser of any conventional design that is commonly employed on residential refrigerators that have an ice maker.

A power supply 116 is provided and the power supply 116 is integrated into the peaked housing 30. The power supply 116 is electrically coupled to each of the evaporator 58 and the compressor 64 and the condenser 70 and the water pump 92 and the dispenser 24. The power supply 116 comprises a rechargeable battery 118 which is positioned within the peaked housing 30 and an inverter 120 which is positioned within the peaked housing 30. The inverter 120 has an input 122 which is electrically coupled to the rechargeable battery 118 thereby enabling the inverter 120 to convert direct current produced by the rechargeable battery 118 into alternating current. Furthermore, the inverter 120 has an output 124 which is electrically coupled to each of the evaporator 58 and the compressor 64 and the condenser 70 and the water pump 92 and the dispenser 24.

The power supply 116 includes a pair of solar panels 126 and each of the pair of solar panels 126 is disposed on a respective one of the pair of sidelong walls 54 of the peaked housing 30. In this way at least one of pair of solar panels 126 is exposed to sunlight regardless of the orientation of the refrigerator 12 with respect to the sun. The power supply 116 includes a charge controller 128 which is positioned within the peaked housing 30 and the charge controller 128 has an input 130 which is electrically coupled to each of the pair of solar panels 126. Additionally, the charge controller 128 has an output 132 which is electrically coupled to the rechargeable battery 118 thereby enabling the charge controller 128 to control the charging of the rechargeable battery 118.

In use, the refrigerator 12 is placed in a remote location, such as campsite for example, and the first fluid supply hose 98 is fluidly coupled to the fluid source 100. The cold food items 16 are placed in the internal compartment 14 to facilitate the cold food items 16 to be kept at a cooled temperature by the refrigeration unit 18. The dispense button 112 can be depressed to actuate the dispenser 24 to dispense ice cubes 26 that have been produced by the ice maker 22. In this way the refrigerator 12 enables the user 28 to keep the cold food items 16 at a cold temperature in the remote location and to enjoy ice cubes 26 in their beverages.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A solar powered refrigerator device for cooling beverage containers and producing ice cubes, said device comprising:
   a refrigerator having an internal compartment being configured to contain cold food items, said refrigerator having a refrigeration unit being integrated into said refrigerator, said refrigeration unit being in thermal communication with said internal compartment wherein said refrigeration unit is configured to cool the cold food items in said internal compartment;
   wherein said refrigerator has a door being hingedly disposed on said refrigerator for opening and closing said internal compartment;
   wherein said refrigerator includes an ice maker being integrated into said refrigerator;

wherein said ice maker includes a dispenser being integrated into said refrigerator thereby enabling said ice maker to be actuated to release ice cubes through said dispenser;
wherein said refrigerator has a peaked housing being located on top of said refrigerator, said peaked housing tapering into a peak such that said peaked housing has a triangular shape;
said refrigeration unit includes an evaporator and a compressor and a condenser;
said ice maker includes a water pump;
said device includes a power supply being integrated into said peaked housing;
said power supply is electrically coupled to each of said evaporator and said compressor and said condenser and said water pump and said dispenser;
said power supply comprises:
   a rechargeable battery being positioned within said peaked housing;
   an inverter being positioned within said peaked housing, said inverter having an input being electrically coupled to said rechargeable battery thereby enabling said inverter to convert direct current produced by said rechargeable battery into alternating current, said inverter having an output being electrically coupled to each of said evaporator and said compressor and said condenser and said water pump and said dispenser;
   a pair of solar panels, each of said pair of solar panels being disposed on a respective one of said pair of sidelong walls of said peaked housing wherein at least one of pair of solar panels is configured to be exposed to sunlight regardless of the orientation of said refrigerator with respect to the sun; and
   a charge controller being positioned within said peaked housing, said charge controller having an input being electrically coupled to each of said pair of solar panels, said charge controller having an output being electrically coupled to said rechargeable battery thereby enabling said charge controller to control the charging of said rechargeable battery.

2. The device according to claim 1, wherein:
said refrigerator has a front wall and a back wall and a top wall;
said internal compartment is located adjacent to said top wall;
said internal compartment extends from said front wall toward said back wall;
said front wall has an opening extending into said internal compartment;
said door has a lateral edge hingedly coupled to a lateral bounding edge of said opening in said front wall;
said door closes said opening when said door is in a closed position;
said door exposes said opening when said door is in an open position;
said peaked housing is disposed on said top wall of said refrigerator;
said peaked housing has a forward wall and a rear wall and a pair of sidelong walls;
said forward wall is aligned with said front wall of said refrigerator;
said rear wall is aligned with said back wall of said refrigerator;

7

8 each of said pair of sidelong walls slants toward each other such that said pair of sidelong walls intersect at said peak, said peak being spaced from said top wall of said refrigerator;

said peak is oriented to extend between said forward wall and said rear wall; and said refrigerator has a plurality of vents each extending through said back wall of said refrigerator wherein each of said plurality of vents is configured to pass air into said refrigerator.

3. The device according to claim 1, wherein:

said ice maker includes a freezer being positioned within said refrigerator;

said freezer has a fluid inlet and an ice outlet;

said ice maker includes a water pump being positioned within said refrigerator;

said water pump has an input and an output;

said ice maker includes a first fluid supply hose being fluidly coupled to said input of said water pump;

said first fluid supply hose extends outwardly through a back wall of said refrigerator thereby enabling said first fluid supply hose to be fluidly coupled to a fluid source thereby enabling said water pump to receive a fluid from said fluid source;

said ice maker includes a second fluid supply hose being fluidly coupled between said output of said water pump and said fluid inlet of said freezer thereby enabling said water pump to pump said fluid into said freezer thereby enabling said freezer to freeze said fluid into the ice cubes.

4. The device according to claim 1, wherein:

said dispenser includes a dispense button being movably disposed on an exposed surface of said dispenser with respect to a front wall of said refrigerator wherein said dispense button is configured to be manipulated by the user;

said dispenser is actuated to dispense the ice cubes while said dispense button is being depressed; and said dispenser is de-actuated when said dispense button is not being depressed.

5. The device according to claim 1, wherein:

said refrigeration unit includes an evaporator and a compressor and a condenser;

said ice maker includes a water pump;

said device includes a power supply being integrated into said peaked housing;

said power supply is electrically coupled to each of said evaporator and said compressor and said condenser and said water pump and said dispenser;

said power supply comprises:

a rechargeable battery being positioned within said peaked housing;

an inverter being positioned within said peaked housing, said inverter having an input being electrically coupled to said rechargeable battery thereby enabling said inverter to convert direct current produced by said rechargeable battery into alternating current, said inverter having an output being electrically coupled to each of said evaporator and said compressor and said condenser and said water pump and said dispenser;

a pair of solar panels, each of said pair of solar panels being disposed on a respective one of said pair of sidelong walls of said peaked housing wherein at least one of pair of solar panels is configured to be exposed to sunlight regardless of the orientation of said refrigerator with respect to the sun; and a charge controller being positioned within said peaked housing, said charge controller having an input being electrically coupled to each of said pair of solar panels, said charge controller having an output being electrically coupled to said rechargeable battery thereby enabling said charge controller to control the charging of said rechargeable battery.

6. The device according to claim 1, further comprising:

said refrigerator having a front wall and a back wall and a top wall, said internal compartment being located adjacent to said top wall, said internal compartment extending from said front wall toward said back wall, said front wall having an opening extending into said internal compartment, said door having a lateral edge hingedly coupled to a lateral bounding edge of said opening in said front wall, said door closing said opening when said door is in a closed position, said door exposing said opening when said door is in an open position, said peaked housing being disposed on said top wall of said refrigerator, said peaked housing having a forward wall and a rear wall and a pair of sidelong walls, said forward wall being aligned with said front wall of said refrigerator, said rear wall being aligned with said back wall of said refrigerator, each of said pair of sidelong walls slanting toward each other such that said pair of sidelong walls intersect at said peak, said peak being spaced from said top wall of said refrigerator, said peak being oriented to extend between said forward wall and said rear wall, said refrigerator having a plurality of vents each extending through said back wall of said refrigerator wherein each of said plurality of vents is configured to pass air into said refrigerator, said refrigeration unit including:

said evaporator being positioned within said refrigerator, said evaporator having an input and an output, said evaporator being in thermal communication with said internal compartment in said refrigerator thereby enabling said evaporator to cool said internal compartment;

said compressor being positioned within said refrigerator, said compressor having an exhaust and an intake;

said condenser being positioned within said refrigerator, said condenser having an exhaust and an intake, said condenser being in fluid communication with said plurality of vents in said back wall of said refrigerator wherein said condenser is configured to direct heated air which is produced by heat exchange with said refrigerant in said evaporator outwardly through said plurality of vents;

a first refrigerant tube being fluidly coupled between said output on said evaporator and said intake of said condenser thereby enabling a refrigerant to be transported from said evaporator and said condenser;

a second refrigerant tube being fluidly coupled between said exhaust of said compressor and said intake of said condenser thereby enabling said refrigerant to be transported from said compressor to said condenser, said second refrigerant tube having a bypass valve being fluidly integrated into said second refrigerant tube, said bypass valve having an outlet; and a third refrigerant tube being fluidly coupled between said outlet of said bypass valve and said input of said evaporator thereby enabling said refrigerant to be transported from said bypass valve to said evaporator when said refrigerant is below a threshold temperature;

wherein said ice maker includes:

a freezer being positioned within said refrigerator, said freezer having a fluid inlet and an ice outlet;

said water pump being positioned within said refrigerator, said water pump having an input and an output;

a first fluid supply hose being fluidly coupled to said input of said water pump, said first fluid supply hose extending outwardly through said back wall of said refrigerator thereby enabling said first fluid supply hose to be fluidly coupled to a fluid source thereby enabling said water pump to receive a fluid from said fluid source;

a second fluid supply hose being fluidly coupled between said output of said water pump and said fluid inlet of said freezer thereby enabling said water pump to pump said fluid into said freezer thereby enabling said freezer to freeze said fluid into the ice cubes;

a chute being attached to said ice outlet of said freezer thereby enabling said chute to receive the ice cubes produced by said freezer, said chute being coupled to an inlet of said dispenser thereby enabling said dispenser to receive the ice cubes, said dispenser extending through said front wall of said refrigerator; and a drain tube being fluidly coupled between said chute and said water pump thereby enabling water produced by melting of the ice cubes to be released through said water pump; and wherein said dispenser includes a dispense button being movably disposed on an exposed surface of said dispenser with respect to said front wall of said refrigerator wherein said dispense button is configured to be manipulated by the user, said dispenser being actuated to dispense the ice cubes while said dispense button is being depressed, said dispenser being de-actuated when said dispense button is not being depressed.

7. A solar powered refrigerator device for cooling beverage containers and producing ice cubes, said device comprising:

a refrigerator having an internal compartment being configured to contain cold food items, said refrigerator having a refrigeration unit being integrated into said refrigerator, said refrigeration unit being in thermal communication with said internal compartment wherein said refrigeration unit is configured to cool the cold food items in said internal compartment;

wherein said refrigerator has a door being hingedly disposed on said refrigerator for opening and closing said internal compartment;

wherein said refrigerator includes an ice maker being integrated into said refrigerator;

wherein said ice maker includes a dispenser being integrated into said refrigerator thereby enabling said ice maker to be actuated to release ice cubes through said dispenser;

wherein said refrigerator has a peaked housing being located on top of said refrigerator, said peaked housing tapering into a peak such that said peaked housing has a triangular shape;

wherein said refrigerator has a back wall;

wherein said back wall has a plurality of vents extending through said back wall wherein said plurality of vents is configured to pass air into said refrigerator;

wherein said refrigeration unit includes an evaporator being positioned within said refrigerator;

wherein said evaporator has an input and an output;

wherein said evaporator is in thermal communication with said internal compartment in said refrigerator thereby enabling said evaporator to cool said internal compartment;

wherein said refrigeration unit includes a compressor being positioned within said refrigerator;

wherein said compressor has an exhaust and an intake;

wherein said refrigeration unit includes a condenser being positioned within said refrigerator;

wherein said condenser has an exhaust and an intake;

wherein said condenser is in fluid communication with said plurality of vents in said back wall of said refrigerator wherein said condenser is configured to direct heated air which is produced by heat exchange with said refrigerant in said evaporator outwardly through said plurality of vents;

wherein said refrigeration unit includes a first refrigerant tube being fluidly coupled between said output on said evaporator and said intake of said compressor thereby enabling a refrigerant to be transported from said evaporator and said compressor;

wherein said refrigeration unit includes a second refrigerant tube being fluidly coupled between said exhaust of said compressor and said intake of said condenser thereby enabling said refrigerant to be transported from said compressor to said condenser;

wherein said second refrigerant tube has a bypass valve being fluidly integrated into said second refrigerant tube;

wherein said bypass valve has an outlet; and wherein said refrigeration unit includes a third refrigerant tube being fluidly coupled between said outlet of said bypass valve and said input of said evaporator thereby enabling said refrigerant to be transported from said bypass valve to said evaporator when said refrigerant is below a threshold temperature.

8. A solar powered refrigerator device for cooling beverage containers and producing ice cubes, said device comprising:

a refrigerator having an internal compartment being configured to contain cold food items, said refrigerator having a refrigeration unit being integrated into said refrigerator, said refrigeration unit being in thermal communication with said internal compartment wherein said refrigeration unit is configured to cool the cold food items in said internal compartment;

wherein said refrigerator has a door being hingedly disposed on said refrigerator for opening and closing said internal compartment;

wherein said refrigerator includes an ice maker being integrated into said refrigerator;

wherein said ice maker includes a dispenser being integrated into said refrigerator thereby enabling said ice maker to be actuated to release ice cubes through said dispenser;

wherein said refrigerator has a peaked housing being located on top of said refrigerator, said peaked housing tapering into a peak such that said peaked housing has a triangular shape;

wherein said ice maker includes a freezer being positioned within said refrigerator;

wherein said freezer has a fluid inlet and an ice outlet;

wherein said ice maker includes a water pump being positioned within said refrigerator;

wherein said water pump has an input and an output;

wherein said ice maker includes a first fluid supply hose being fluidly coupled to said input of said water pump;

wherein said first fluid supply hose extends outwardly through a back wall of said refrigerator thereby enabling said first fluid supply hose to be fluidly 5 coupled to a fluid source thereby enabling said water pump to receive a fluid from said fluid source;

wherein said ice maker includes a second fluid supply hose being fluidly coupled between said output of said water pump and said fluid inlet of said freezer thereby 10 enabling said water pump to pump said fluid into said freezer thereby enabling said freezer to freeze said fluid into the ice cubes wherein said ice maker includes a chute being attached to said ice outlet of said freezer thereby enabling said chute to receive the ice cubes 15 produced by said freezer;

wherein said chute is coupled to an inlet of said dispenser thereby enabling said dispenser to receive the ice cubes;

wherein said dispenser extends through a front wall of 20 said refrigerator; and wherein said ice maker includes a drain tube being fluidly coupled between said chute and said water pump thereby enabling water produced by melting of the ice cubes to be released through said water pump. 25

* * * * *